3,208,981
PROCESS FOR PREPARING TERPOLYMERS CONTAINING OXAZOLINE UNITS
Thomas J. Miranda, Granger, and Herbert R. Herman, South Bend, Ind., assignors to The O'Brien Corporation, South Bend, Ind., a corporation of Indiana
No Drawing. Filed May 7, 1962, Ser. No. 192,972
10 Claims. (Cl. 260—78.5)

This invention is related to copolymers suitable for the preparation of coating compositions. More specifically, it is related to copolymers of vinyl aryl hydrocarbons, such as styrene, unsaturated esters, such as 2-ethylhexyl acrylate, and unsaturated acids, such as acrylic acid, with or without additional comonomers, which copolymers are subsequently reacted with particular amine compounds and the resultant amide groups converted to oxazolino radicals.

Resins containing a substantial proportion of styrene therein are generally brittle and therefore cannot be used in protective coatings where such coatings are to undergo post-forming operations, such as in the manufacture of cans, house-siding, metal furniture, etc. In such compositions, there is also a need for resistance to water and detergents. Such resistance is also needed in polymeric compositions used as finishes or coating compositions in the manufacture of appliances, such as refrigerators, washing machines, etc. Such uses require a polymer having flexibility incorporated in the polymer chain or having post-flexibilizing properties incorporated by selection of an appropriate curing agent. Moreover, one of the serious objections to thermosetting acrylic resins has been the difficulty encountered in obtaining good grease and stain resistance.

In accordance with the present invention it has now been found that the above-mentioned desirable properties can be incorporated in resins having substantial proportions of styrene, etc. therein by the preparation of copolymers having 20-85% preferably 25-75% of styrene, 10-75% preferably 16-60%, of an acrylate or methacrylate ester having 4-10 carbon atoms in the ester group thereof, or of a dialkyl maleate, fumarate, itaconate or tetrahydrophthalate having no more than 10 carbon atoms in each alkyl group, and 1-15%, preferably 5-10% of an unsaturated acid, such as acrylic, methacrylic, maleic, fumaric, itaconic and tetrahydrophthalic acids, thereafter reacting such copolymers with a compound having one amino group and 1-3, preferably 2-3, hydroxy groups therein, which hydroxy group or groups are each at least two carbon atoms removed from the amino group, at least one of which hydroxy groups is exactly 2 carbon atoms removed from said amino groups, and thereafter converting at least some of the resulting amide groups to oxazolino rings. Applicants' copending application filed the same date herewith discloses and claims the intermediate amides and the process of preparation thereof.

The resultant polymeric oxazolines are found to have the desired flexibility and are also found to have improved recoatability, improved corrosion and detergent resistance, and improved flexibility even in comparison with the intermediate polymeric amide.

The amino hydroxy compounds found suitable for the practice of this invention are those having two hydrogen atoms on the amino group and at least two carbon atoms between the amino group and each hydroxy group therein. When the hydroxy group and the amino group are on the same carbon atom, the compositions do not have the desired stability. Advantageously, the amine-hydroxy compound has no more than ten carbon atoms therein since the bulk of larger radicals detract from the desired properties of the product. Preferred compounds of this type are those having a primary amino group, that is, having two hydrogen atoms on the nitrogen.

Particularly desirable are amino-hydroxy compounds having a plurality of hydroxy groups therein which increase the adaptability for post reaction. For this purpose, amino-trimethylolmethane is particularly desirable. Also preferred are 2 - amino - 1,1 - dimethylol - propane; 2-amino-1,3-propanediol; 2-amino-1,4-butanediol; amino-diethylol-methane; 1-amino-3,4-butanediol; 3-amino-2,4,5-trihydroxy-hexane; 1-amino-2,2,2-trimethylol-ethane; etc. Also suitable are 2-amino-propanol-1; 3-amino-propanol - 1; 3-amino-butanol-1; 3-ethylamino-butanediol-1,4; 3-phenyl-2-amino-propanol-1; 1 - amino-4-methylol-cyclohexanol-1; 2-amino-cyclohexanol, etc.

Particularly preferred as an unsaturated ester for the practice of this invention is 2-ethyl-hexyl acrylate. However, various other acrylates and methacrylates are found to impart suitable plasticity and other desired properties, when there are 4-10 carbon atoms in the ester group. Also suitable are dialkyl esters of maleic, fumaric, itaconic and tetrahydrophthalic acids. Typical suitable compounds include butyl acrylate, amyl acrylate, amyl methacrylate, hexyl acrylate, heptyl acrylate, octyl methacrylate, octyl acrylate, nonyl acrylate, decyl acrylate, etc. In addition to the types listed above, the ester group can consist of a substituted alkyl group, such as ethoxyethyl, ethoxybutyl, butoxybutyl, etc., provided there are at least the stated number of carbon atoms in the ester groups. However, when the acid from which the unsaturated ester is one which is difunctional, such maleic, fumaric, itaconic and tetrahydrophthalic acids, the greater number of atoms in the acid portion of the compound supplies sufficient plasticity and there can be as little as one carbon atom in the ester groups of such compounds. For example, dimethyl maleate, dimethyl itaconate, diethyl maleate, dipropyl fumarate, dibutyl maleate, diamyl itaconate, dimethyl tetrahydrophthalate, dibutyl tetrahydrophthalate, etc. are satisfactory.

In addition to styrene which is preferred for the practice of this invention, other vinyl aryl hydrocarbons can be used, such as vinyl naphthalene, vinyl diphenyl, and various derivatives of styrene, vinyl naphthalene and vinyl diphenyl which have various hydrocarbon groups such as alkyl, aryl and cycloalkyl, substituted on the aromatic nuclei, such as methyl styrene, dimethyl styrene, ethyl styrene, vinyl methyl naphthalene, vinyl ethyl naphthalene, vinyl butyl naphthalene, vinyl amyl diphenyl, vinyl methyl diphenyl, cyclohexyl styrene, vinyl cyclohexyl naphthalene, vinyl cyclopentyl naphthalene, vinyl cyclohexyl diphenyl, etc. Derivatives having a small number of carbon atoms in the substituent groups are preferred and it is generally undesirable to have more than a total of 8 carbon atoms in such substituent groups. The vinyl vinyl aryl hydrocarbons can be represented by the formula $CH_2=CH-Ar$, and the repeating unit structures derived therefrom can be represented by $$-CH_2CH-$$
$$\;\;\;\;\;\;\;\;|$$
$$\;\;\;\;\;\;\;\;Ar$$

wherein Ar represents an aromatic hydrocarbon nuclei and hydrocarbon derivatives, such as illustrated above.

The various unsaturated esters that can be used in the practice of this invention, such as illustrated above, can be represented by the following formulas:

$$CH_2=CX\;\;\;\;;\;\;CH=CH-COOR'\;;\;CH_2=C-COOR'$$
$$\;\;\;\;|\;\;\;\;\;\;\;\;\;\;\;\;\;\;|$$
$$COOR\;\;\;\;\;COOR'\;\;\;\;\;\;\;\;\;\;\;\;\;CH_2-COOR'$$

and $$\begin{matrix} & CH_2 & \\ CH & \diagdown & CH-COOR' \\ \| & & | \\ CH & & CH-COOR' \\ & \diagup & \\ & CH_2 & \end{matrix}$$

In these formulas X is hydrogen or methyl; R is an alkyl group of 4–10 carbon atoms; R' is an alkyl group of 1–10 carbon atoms.

When these are copolymerized as described herein, the repeating units in the polymer molecules resulting therefrom have the following formulas respectively:

$$-CH_2\underset{COOR}{\overset{X}{C}}- \quad ; \quad -\underset{COOR'}{CH}\underset{COOR'}{CH}- \quad ; \quad -CH_2\underset{CH_2COOR'}{\overset{COOR'}{C}}-$$

and $$\begin{matrix} -CH-CH- \\ \diagup \quad \diagdown \\ CH_2 \quad CH_2 \\ \diagdown \quad \diagup \\ CH-CH \\ | \quad | \\ COOR' \quad COOR' \end{matrix}$$

The various unsaturated acids that can be used, as described above, are represented by the following formulas:

$$CH_2{=}CX \quad ; \quad CH{=}CH{-}COOH$$
$$\quad | \qquad\qquad\qquad |$$
$$COOH \qquad\qquad COOR'$$

$$CH_2{=}C{-}COOH \quad ; \quad CH_2{=}C{-}COOR'$$
$$\quad\ \ |\qquad\qquad\qquad\quad\ \ |$$
$$CH_2COOR'' \qquad\quad CH_2COOH$$

and $$\begin{matrix} & CH-COOH \\ \diagup & | \\ C_4H_6 & \\ \diagdown & | \\ & CH-COOR'' \end{matrix}$$

wherein X and R' are as defined above and R'' is hydrogen or an alkyl group of 1–10 carbon atoms.

The corresponding repeating units present in the resultant copolymers have the following formulas respectively:

$$-CH_2\underset{COOH}{\overset{X}{C}}- \ ; -\underset{COOH}{CH}\underset{COOH}{CH}- ; -CH_2\underset{COOH}{\overset{CH_2COOR''}{C}}- \ ; -CH_2\underset{CH_2COOH}{\overset{COOR'}{C}}-$$

and $$\begin{matrix} -CH-CH- \\ \diagup \quad \diagdown \\ CH_2 \quad CH_2 \\ \diagdown \quad \diagup \\ CH-CH \\ | \quad | \\ COOR'' \quad COOH \end{matrix}$$

The amine-hydroxy compounds suitable for the practice of this invention are represented by the formula:

$$\underset{CH_2OH}{\underset{R''_nC(Z''OH)_{2-n}}{\overset{NH_2}{|}}}$$

wherein R'' is hydrogen or an alkyl group of no more than 10 carbon atoms, preferably no more than 6; $n$ has a value of 0, 1 or 2; Z'' is a divalent aliphatic, cycloaliphatic or aromatic hydrocarbon radical having no more than 10 carbon atoms therein or monohydroxy derivative thereof, preferably aliphatic and having no more than 4 carbon atoms, the total number of OH groups in said Z''OH groups of any such compound totaling no more than 3, preferably no more than 2.

When the unsaturated acid copolymers are reacted with these amine-hydroxy compounds, the resultant copolymers have repeating units therein of the formulas:

$$-CH_2\underset{\underset{\underset{CH_2OH}{R''_nC(Z''OH)_{2-n}}}{CONH}}{\overset{X}{\underset{|}{C}}}- \quad ; \quad -\underset{\underset{\underset{CH_2OH}{R''_nC(Z''OH)_{2-n}}}{CONH}}{CH}\underset{}{\overset{COK}{CH}}-$$

$$-CH_2\underset{\underset{\underset{CH_2OH}{R''_nC(Z''OH)_{2-n}}}{CONH}}{\overset{CH_2COK}{C}}- \quad ; \quad -CH_2\underset{\underset{\underset{CH_2OH}{R''_nC(Z''OH)_{2-n}}}{CH_2CONH}}{\overset{COK}{C}}-$$

and $$\begin{matrix} -CH\!-\!\!-\!\!-CH- \\ \diagup \qquad \diagdown \\ CH_2 \qquad CH_2 \\ \diagdown \qquad \diagup \\ CH\!-\!\!-\!\!-CH \\ | \qquad\quad | \\ OOK \quad CONH \\ \qquad\quad | \\ \qquad R''_nC(Z''OH)_{2-n} \\ \qquad\quad | \\ \qquad\quad CH_2OH \end{matrix}$$

wherein X, R'', Z'' and $n$ are as defined above and K is OR' or $$\underset{CH_2OH}{\underset{R''_nC(Z''OH)_{2-n}}{\overset{-NH}{|}}}$$

When the oxazoline rings are formed in accordance with this invention, the corresponding repeating units are represented by the formulas:

$$-CH_2\underset{\underset{R''_nC(Z''OH)_{2-n}}{\underset{N}{\overset{C\!-\!\!-\!\!-O}{\|}}\diagdown_{CH_2}}}{\overset{X}{C}}- \ ; -\underset{\underset{R''_nC(Z''OH)_{2-n}}{\underset{N}{\overset{C\!-\!\!-\!\!-O}{|}}\diagdown_{CH_2}}}{CH}-\overset{K'}{CH}- \ ; -CH_2\underset{\underset{R''_nC(Z''OH)_{2-n}}{\underset{N}{\overset{C\!-\!\!-\!\!-O}{|}}\diagdown_{CH_2}}}{\overset{CH_2K'}{C}}-$$

$$-CH_2\underset{\underset{R''_nC(Z''OH)_{2-n}}{\underset{N}{\overset{CH_2\!-\!\!C\!-\!\!O}{|}}\diagdown_{CH_2}}}{\overset{K'}{C}}-$$

and $$\begin{matrix} -CH\!-\!\!-\!\!-CH- \\ \diagup \qquad \diagdown \\ CH_2 \qquad CH_2 \\ \diagdown \qquad \diagup \\ CH\!-\!\!-\!\!-CH \\ | \qquad\quad | \\ K' \qquad C\!-\!\!-\!\!O \\ \qquad \| \ \diagdown \\ \qquad N \quad CH_2 \\ \qquad \diagdown \ \diagup \\ \qquad R''_nC(Z''OH)_{2-n} \end{matrix}$$

wherein X, R'', Z'' and $n$ are as defined above, and K' is —COR'

$$\underset{CH_2OH}{\underset{R''_nC(Z''OH)_{2-n}}{\overset{-CONH}{|}}}$$

or $$\underset{R''_nC(Z''OH)_{2-n}}{\underset{N}{\overset{-C\!-\!\!O}{\|}}\diagdown_{CH_2}\diagup}$$

While other methods can be used for determining the progress of the amidification reaction, and oxazolino ring formation, this can be easily determined by running the reaction in such a manner that the water of condensation is refluxed and collected, for example, by using toluene to form an azeotrope. When approximately the theoretical amount of water is collected as would be formed by the formation of the amide in accordance with the amounts of materials used, this indicates that the reagents have been substantially completely converted to the amide. As additional reflux water is collected this indicates increasing conversion of the amide groups to the oxazolino ring structure. When approximately the theoretical amount of water is collected, allowing for small amounts lost mechanically and by vapor loss, substantially complete conversion to oxazolino structures is indicated.

Particularly tough, clear, chemically resistant films of excellent solvent and grease resistance are formed when resins of this invention are used which are of a structure and conditions are used which convert the above type of amides to the corresponding oxazolino structure as described above. These resins are improved even over the intermediate amide resins with respect to producing coatings of improved recoatability, corrosion and detergent resistance, and improved flexibility.

The invention is best illustrated by the following examples, which are given merely for illustrative purposes. It is not intended that these examples in any way limit the scope of the invention or the manner in which the invention can be practiced. Unless specifically indicated otherwise, reference to parts or percentages are by weight.

*Example I*

Into a resin kettle equipped with stirrer, nitrogen, inlet, reflux condenser, thermometer and a device for dropwise addition of liquid, there is added 250 parts of Cellosolve (ethoxyethyl) acetate. The atmosphere in the kettle is swept out with nitrogen and a blanket of nitrogen maintained during the heating and subsequent reaction. The temperature of the liquid is raised to 130° C. and then a monomeric mixture is added dropwise over a two hour period, during which the temperature rises to 148° C. This monomeric mixture consists of:

| | Parts |
|---|---|
| Styrene | 200 |
| 2-ethyl hexyl acrylate | 300 |
| Glacial acetic acid | 72 |
| Ditertiary butyl peroxide | 4 |

The addition is effected over a 2.5 hour period and the temperature maintained for an additional two hours. At the end of this time 121 parts of amino-tri(hydroxymethyl)methane is added to the reaction mixture. An appropriate amount of toluene is added and a water separator is attached to collect reflux water. At the point when approximately 17–18 parts of water have been collected in the separator, the product has reached the intermediate amide stage. However, the refluxing is continued until a total of approximately 34 parts of water are collected. This is slightly less than the theoretical for complete oxazoline conversion since there are some vapor losses through the condenser. The product thus obtained is substantially completely converted to the oxazolino acrylate structure having the repeating unit formula:

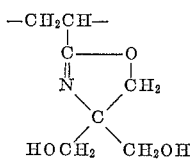

The polymer product is cooled and then blended with a melamine-formaldehyde resin in a proportion of 3 parts of said resin to 1 part of melamine-formaldehyde resin and 4 parts of aromatic solvent. The melamine-formaldehyde resin is one having an acid number of less than 1, and when dissolved in 20% butanol plus 20% xylene, it has a Gardner viscosity of M, APHA color or less than 50, and specific gravity of 1.035. Films of the blend are applied to a metal surface and baked for thirty minutes at 300° F. The resultant film is clear, tough and has excellent resistance to alkali, solvents and grease.

*Example II*

The procedure of Example I is repeated except that the heating is stopped when 27 parts of water are separated. It is found that the resultant polymer has approximately equal proportions of the structure of the substituted amide and of the oxazolino ring structure.

*Example III*

The procedure of Example I is repeated again, except that the reaction is stopped when 22.5 parts of water are separated. In this case, the resultant polymer has a structure of three groups of the substituted amide structure per group of the oxazoline type. Nevertheless, the difference in properties is evident even with this low proportion of oxazoline structure.

*Example IV*

The procedure of Example I is repeated except that amino-tri(methylolmethyl)methane is replaced with an equivalent amount of 2-amino-2-methyl-1,3-propanediol. Similar results are obtained. The oxazoline portion of the polymer has a repeating unit structure of the formula:

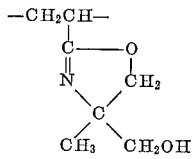

*Example V*

The procedure of Example IV is repeated except that only 27 parts of water are removed and in this case, the polymer has approximately equal portions of the substituted amide structure and the oxazoline structure shown in Example IV.

*Example VI*

The procedure of Example I is repeated except that an equivalent amount of 2-amino-2-ethyl-1,3-propanediol is used in place of the amino-tri(methylol)methane. Similar results are obtained in which the oxazoline portion of the product has a repeating unit structure of the formula:

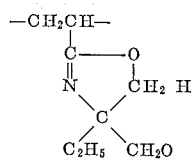

*Example VII*

The procedure of Example I is repeated except that an equivalent amount of 2-amino-2-methyl-1-propanol is used in place of the amino-tri(methylol)methane. Similar results are obtained in which the oxazoline portion of the product has the repeating unit structure of the formula:

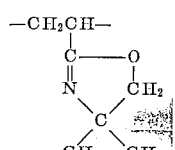

*Example VIII*

The procedure of Example I is repeated except that an equivalent amount of 2-amino-1-butanol is used in place of the amino-tri(methylol)methane. Similar results are obtained in which the oxazoline portion of the product has the repeating unit structure of the formula:

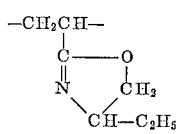

Example IX

The procedure of Example I is repeated using 43.7 parts of 2-amino-2-methyl-1,3-propanediol in the place of the trimethylol compound. Excellent results are obtained when a paint is prepared from the resultant resin.

Example X

An automotive finish is prepared from the resin prepared in Example I using 49.4 parts of said resin, 21.4 parts finely divided titanium dioxide, 13.2 parts of melamine resin, 6.35 parts high boiling aromatic solvent, 1.4 parts xylol and 5.2 parts high flash naphtha. The melamine resin which is added consists of two melamine-formaldehyde resins. 6.9 parts of the first resin is added as a 60% solution in equal parts of butanol and xylene, and has an acid number of less than 1, a Gardner viscosity of M, color of less than 50 (APHA) and specific gravity of 1.035. 6.2 parts of the second melamine resin are added as a 50% solution in 40% butanol and 10% xylene, having an acid number less than 1, a Gardner viscosity of G, clear color, and a specific gravity of 0.97. The resultant composition is applied to sheet metal and cured at 250° F. for 45 minutes. The finished enamel has the following properties: no creepage on the salt fog test; good resistance to abrasion by gravel; passes the 28 inch pounds direct impact test; has excellent gloss retention, good alkali resistance, good detergent resistance, and excellent hardness.

Example XI

A baking enamel is prepared using 70 parts of the resin prepared in Example IX, 30 parts of hexa-(methoxymethyl)melamine and 100 parts of aromatic solvent having a boiling range of 185–208° C. A coating of this composition is applied to a metal surface and then baked at 300° F. for thirty minutes without any additional catalyst. The acidity of this resin serves to catalyze this melamine derivative, which otherwise requires a catalyst. The resultant coating has a hard, glossy film with good chemical resistance.

Example XII

The procedure of Example I is repeated using 50 parts styrene, 40 parts 2-ethylhexyl acrylate and 10 parts glacial acrylic acid, with 15.1 parts of amino-tri-(hydroxymethyl) methane being subsequently reacted and a corresponding amount of water removed. Similar results are obtained.

Example XIII

Satisfactory results are also obtained when the procedure of Example XII is repeated a number of times replacing the amino-tri(hydroxymethyl)methane with an equivalent amount of 2-amino-2-methyl-1,3-propanediol, and 2-amino-2-ethyl-1,3-propanediol.

Example XIV

Into the equipment of Example I, there is charged 350 parts of xylene and 50 parts of Cellosolve acetate. This mixture is heated to 130° C. at which time the following mixture is added dropwise: 140 parts of styrene; 200 parts of hexylmethacrylate; 60 parts of glacial acrylic acid and 4 parts of ditertiary butyl peroxide. After this mixture is added, the temperature is held between 130° and 140° C. for 2.5 hours. Then 100 parts of aminotrimethylol-methane are added and the reactor equipped with a separator for reflux water. The mixture is heated at 140° C. until about 40 parts of water are collected. The resin is then cooled and a paint composition prepared as in Example I. Upon testing this paint when dried, it is found to have excellent grease, solvent and detergent resistance.

Example XV

Similar results are obtained when Example XIV is repeated a number of times, replacing the hexyl methacrylate with equivalent amounts of dibutyl maleate, dioctyl fumarate, di-2-ethylhexyl itaconate, ethoxyethyl acrylate, butyl acrylate and octyl methacrylate, respectively.

Example XVI

The procedure of Example I is repeated a number of times with good results when the acrylic acid used therein is replaced with an equivalent amount of maleic anhydride, fumaric acid, methacrylic acid, itaconic anhydride and tetrahydrophthalic anhydride, respectively.

Example XVII

The procedure of Example I is repeated four times with good results when the styrene used therein is replaced with an equivalent amount of vinyl naphthalene, and the acrylic acid is replaced with an equivalent amount of the monomethyl ester of maleic acid, the monoethyl ester of fumaric acid, the monobutyl ester of itaconic acid, and the monoamyl ester of tetrahydrophthalic acid, respectively.

Example XVIII

The procedure of Example I is repeated with good results using an equivalent amount of vinyl diphenyl in place of the vinyl naphthalene.

Example XIX

The procedure of Example I is repeated a number of times with good results when the acrylic acid used there is replaced with an equivalent amount of the monoamides of maleic acide, fumaric acid, itaconic acid and tetrahydrophthalic acid, respectively.

The various polymeric products produced according to the above examples have repeating unit formulas which fit the corresponding formulas described above. For example, in Example I the styrene results in repeating unit formulas of the structure

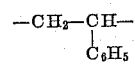

the repeating unit formula resulting from the 2-ethylhexyl acrylate has the repeating unit structure:

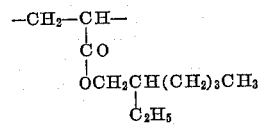

the intermediate acrylic acid amide derivative has the repeating unit structure:

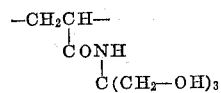

The ultimate polymer has the oxazolino repeating unit of the formula:

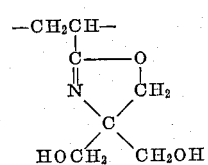

The ultimate polymers of Examples II and III also have the intermediate amide repeating units.

The structure of the intermediate amide repeating unit of Example IX has the structure:

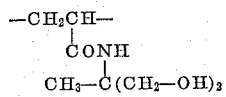

and ring structure repeating unit:

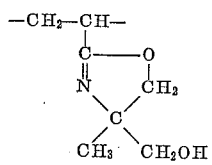

Likewise, the copolymers of Example XIII have intermediate amide repeating unit structures respectively of the formulas:

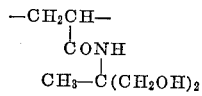

and

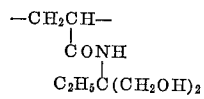

and the ultimate polymers have the repeating units respectively:

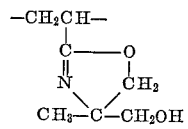

and

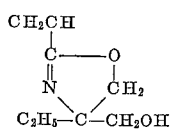

In addition to the various repeating unit components described above, the copolymers of this invention can have various modifying comonomer repeating units derived by incorporating minor amounts, preferably less than 20% of modifying comonomers in the copolymerizable monomeric mixtures, provided such comonomers do not detract from the desired properties of the resultant copolymers. Typical of such modifying comonomers which can be used and generally to contribute desirable properties include, but are not restricted to, vinylchloride, vinylidene chloride, acrylonitrile, acrylamide, vinyl acetate, etc. The resultant copolymers can also be modified by incorporating various fillers, pigments, dyes, inhibitors, antioxidants, driers, solvents, etc.

As shown above the various polymers having repeating units containing pendant hydroxy groups as derived by the practice of this invention are very receptive for post-reaction with various materials condensible with hydroxy groups, for example, melamine-aldehyde resins, i.e. melamine - formaldehyde, phenol - formaldehyde resins, melamine-phenol-formaldehyde resins, urea-formaldehyde resins, epoxy resins, etc.

In preparing the oxazolino rings as described above, it it generally preferred to have the intermediate amide formation proceed to at least 1% by weight of the resultant copolymer or to any higher degree desired. However, sufficient improvements are generally obtained without exceeding 20% by weight of such groups in the copolymer. When the desired proportion of intermediate amide has been formed, excess amine can be removed, if desired by extraction or by distillation where the amine has a relatively low boiling point. Generally, however, it is preferred to add approximately the desired amount of amine to give the desired proportion of intermediate amide and then to complete the ring formation by continuing the heating and water removal after all of the amine has reacted.

It is generally preferred to have at least 0.25 molar equivalent of water removed to give corresponding minimum molar equivalent of amide group in the copolymer to give at least the minimum amount of oxazolino ring formation described above. Eventually, however, depending upon the desired oxazoline content, the corresponding amount of water is removed which will indicate the desired extent of ring formation.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process for the preparation of a polymeric composition of improved flexibility comprising
   reacting a copolymer prepared by the polymerization of a monomeric mixture comprising
   (a) 20–85% by weight of a vinyl aromatic hydrocarbon,
   (b) 1–15% by weight of an unsaturated acid selected from the class consisting of acrylic, methacrylic, maleic, fumaric, itaconic and tetrahydrophthalic acids and the monoamide and the alkyl monoester derivatives of maleic, fumaric, itaconic and tetrahydrophthalic acids, and
   (c) 10–75% of an unsaturated ester selected from the class consisting of acrylates, methacrylates, maleates, fumarates, itaconates and tetrahydrophthalates; the ester group in each of the aforesaid monoesters and diesters being an alkyl group having no more than 10 carbon atoms therein, and in said acrylates and methacrylates, said alkyl ester group having at least 4 carbon atoms therein;
   under conditions suitable for removal of water of condensation resulting from amidification with an amino-hydroxy compound having one amino group and at least one and no more than three hydroxy groups therein, said amino group having at least one hydrogen atom attached to the nitrogen, each said hydroxy group of said amino-hydroxy compound being at least 2 carbon atoms removed from said amino group and at least one of said hydroxy groups being exactly 2 carbon atoms removed from said amino group; said amino hydroxy compound having an aliphatic hydrocarbon nucleus with no more than 10 carbon atoms therein and with no substituent groups thereon other than said amino and said hydroxy groups, and said reaction being conducted until the proportion of amide groups attached by said reaction represents at least 1% by weight of the resultant copolymer; and
   continuing said reaction until at least about 0.25 molar equivalent of water per molar equivalent of amide groups in said copolymer has been removed, thereby to form oxazolino rings from said amide groups.

2. The process of claim 1 in which said monomeric composition comprises 25–75% by weight of said vinyl aryl compound, 15–60% by weight of said unsaturated ester and 5–10% by weight of said unsaturated acid.

3. The process of claim 2 in which said amine group of said amino-hydroxy compound is a primary amine group.

4. The process of claim 3 in which said amino-hydroxy compound has at least 2 hydroxy groups therein.

5. The process of claim 4 in which the hydrocarbon portion of said amine-hydroxy compound has no more than 4 carbon atoms therein.

6. The process of claim 1 in which said vinyl aryl compound is styrene, said unsaturated acid is acrylic acid, and said unsaturated ester is an acrylate.

7. The process of claim 1 in which said vinyl aryl compound is styrene, said unsaturated acid is acrylic acid and said unsaturated ester is 2-ethylhexyl acrylate.

8. The process of claim 7 in which said amino-hydroxy compound is amino-trimethylol-methane.

9. The process of claim 1 in which said amino-hydroxy compound is amino-trimethylol-methane.

10. The process of claim 1 in which said amino-hydroxy compound is 2-amino-2-methylol-propanol-1.

References Cited by the Examiner

UNITED STATES PATENTS

| | | | |
|---|---|---|---|
| 2,851,448 | 9/58 | Slocombe et al. | 260—78.5 |
| 2,897,182 | 7/59 | De Benneville et al. | 260—78.5 |
| 2,905,644 | 9/59 | Butter | 260—307.6 |
| 2,965,459 | 12/60 | De Gray et al. | 260—307.6 |

JOSEPH L. SCHOFER, *Primary Examiner.*

DONALD E. CZAJA, *Examiner.*